Patented Sept. 18, 1928.

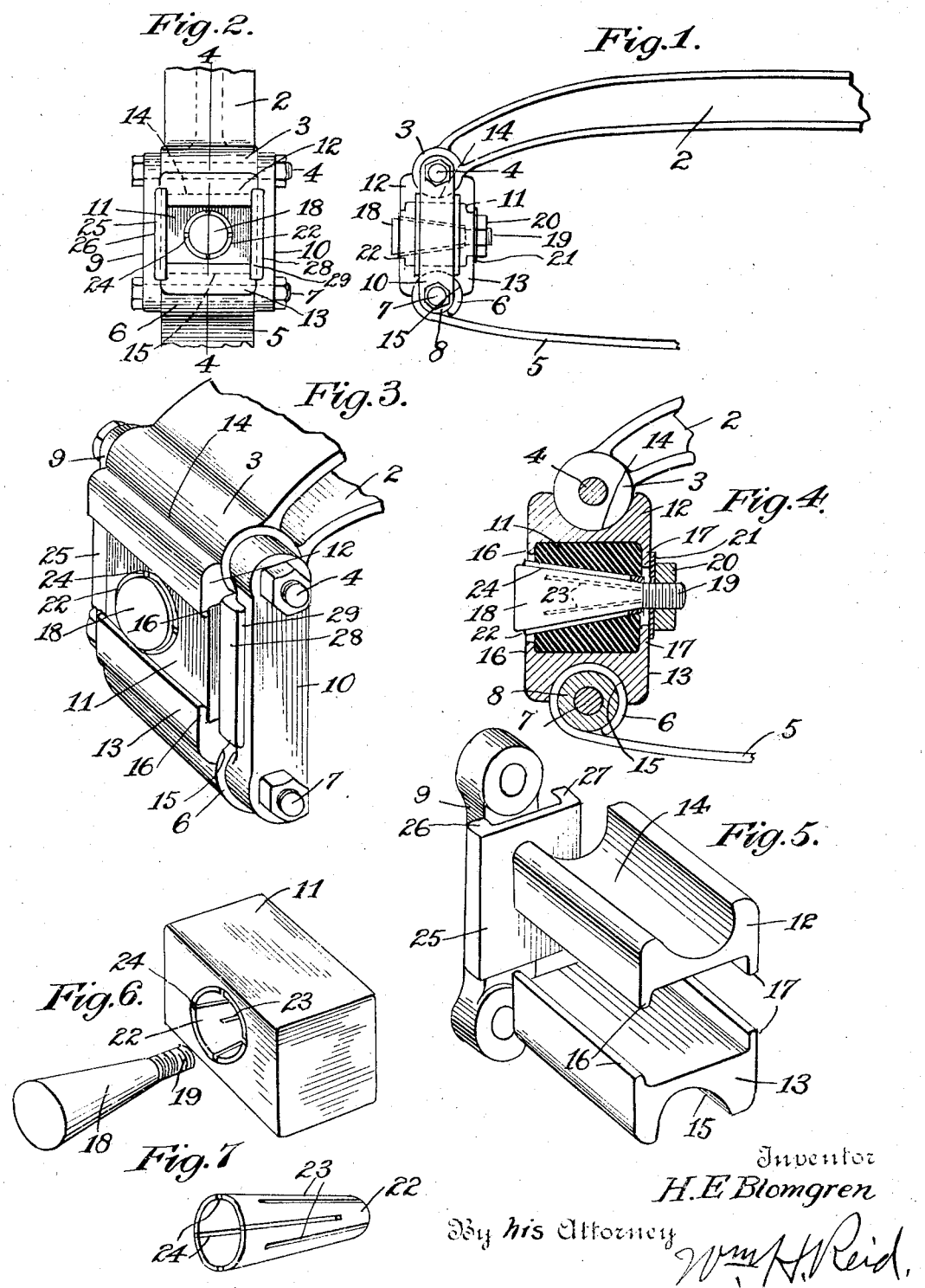

1,684,724

UNITED STATES PATENT OFFICE.

HENRY E. BLOMGREN, OF BROOKLYN, NEW YORK.

SPRING-SHACKLE ANTIRATTLE ATTACHMENT.

Application filed July 21, 1927. Serial No. 207,349.

This invention has reference to attachments for a spring end connection of a motor vehicle, where the spring is mounted or connected with the frame, or other parts, that has some kind of hinge joint permitting the spring to swing.

One of the objects of the invention is to provide a resilient non-metallic block or member placed under tension, and preferably with adjustments, at such hinge joints, to prevent rattle and noise at such locations.

In the accompanying drawings showing embodiment of my invention,

Figure 1 is a side elevation showing the frame member and a spring portion, with the invention applied.

Fig. 2 is an end view of the same.

Fig. 3 is a perspective view enlarged of some of these parts.

Fig. 4 is a transverse section on the line 4—4 of Fig. 1.

Fig. 5 is a view showing some of the parts in relative positions.

Fig. 6 shows the rubber block with the expanding bolt and sleeve.

Fig. 7 shows the expanding sleeve.

As shown in Figs. 1–7 the frame 2 has the usual sleeve end portion or eye 3 that carries the pivot bolt 4. The spring 5 is shown provided with an eye 6 at the end, that receives the usual pivot bolt 7, and may have a sleeve 8 between the bolt and eye. These eye portions are of equal length, and the projecting bolts carry side links 9 and 10, which is the usual construction, that permits the spring to move back and forth on this double hinge arrangement.

In order to prevent rattle and noise at these two hinge joints from wear and lost motion, I place them under tension by the use of a block of resilient material, such as rubber that is caused to exert an outward pressure against the two opposite eye portions and against the two links. A block of rubber 11 is shown, and between this block and the two eyes 3 and 6, I arrange a bearing block, such as 12 and 13, preferably of metal. The block 12 is grooved at 14 to fit the eye 3, and the block 13 is grooved at 15 to engage the sleeve 6. These blocks are respectively provided with flanges at 16 and 17 to receive the rubber block 11, and prevent lateral displacement of the block, as indicated in Fig. 4. It will be understood that the blocks 12 and 13 are placed between the two side links 9 and 10.

Means are further provided for distending the rubber block 11, and I show an expanding member in the form of a conical bolt 18, having a threaded stem 19 that receives the nut 20. The block 11 is provided with a bore extending therethrough, that is conical corresponding to the shape of the bolt. It will be understood that forcing the bolt into this bore will tend to move the parts of the block outwardly in all directions angular to the bolt axis, that is done by screwing up the nut against washer 21 that engages the flanges 17 of the metal blocks 12 and 13. This will obviously tend to expand the rubber block at the two sides engaging the metal blocks 12 and 13, and to move them apart, and into tight engagement with the respective eyes 3 and 6. This will exert a constant pressure on these eyes because of the resiliency of the rubber block, and prevent any rattle or noise at the two joints.

Since the conical bolt 18 is drawn through the bore of the rubber block tending to wear on the same, I provide a sleeve of metal lining this bore, but which is itself permitted to expand outwardly. As shown the sleeve 22 of conical form is provided with slots 23 and 24 extending inwardly from the end portions. This sleeve is placed on the bolt when it is inserted in the bore, and will prevent injurious action to the bolt in the block.

At the ends of the two blocks 12 and 13, and also at the ends of the rubber block 11, I provide a plate between them and the links 9 and 10. At one end is a plate 25, shown with flanges 26 and 27 engaging the edges of the link; while the other plate 28 of similar shape is provided with flanges 29. The conical bolt will expand the rubber block against these two plates 25 and 28, and force them against the two links. This will further tend to prevent rattle or noise from any lost motion at the link connections.

What I claim is:

1. In a spring shackle, the combination with the spring sleeve and the bracket sleeve connected by the side links and a bolt passing through each sleeve and the links, of a pair of bearing blocks each grooved to engage one said sleeve respectively and channeled on the inner opposed faces, a block of resilient material located between said latter block faces, the resilient block having a conical bore, and a conical bolt in said bore arranged to distend the resilient block to press its engaged blocks outwardly.

2. In a spring shackle, the combination with the spring sleeve and the bracket sleeve connected by the side links and a bolt passing through each sleeve and the links, of a pair of bearing blocks each grooved to engage one said sleeve respectively and channeled on the inner opposed faces, a block of resilient material located between said latter block faces, a channeled plate between each link and the ends of the resilient block and adjacent blocks, the resilient block having a conical bore, and a conical bolt in said bore arranged to distend the resilient block to press its engaged blocks outwardly.

3. In a spring shackle, the combination with the spring sleeve and the bracket sleeve connected by the side links and a bolt passing through each sleeve and the links, of a pair of bearing blocks each grooved to engage one said sleeve respectively and channeled on the inner opposed faces, a block of resilient material located between said latter block faces, the resilient block having a conical bore, and a conical bolt in said bore arranged to distend the resilient block to press its engaged blocks outwardly, and a conical split sleeve bearing element between the bolt and the resilient block.

4. In a spring shackle, the combination with the spring sleeve and the bracket sleeve connected by the side links and a bolt passing through each sleeve and the links, of a pair of bearing blocks each grooved to engage one said sleeve respectively and channeled on the inner opposed faces, a block of resilient material located between said latter block faces, a channeled plate between each link and the ends of the resilient block and adjacent blocks, the resilient block having a conical core, and a conical bolt in said bore arranged to distend the resilient block to press its engaged blocks outwardly, and a conical split sleeve bearing element between the bolt and the resilient block.

5. In a spring shackle, the combination with the spring sleeve and the bracket sleeve connected by the side links and a bolt passing through each sleeve and the links, of a pair of bearing blocks each grooved to engage one said sleeve respectively, a block of resilient material located between said latter block faces, a plate between each link and the ends of the resilient block and the adjacent blocks, the resilient block having a conical bore, a conical bolt in said bore arranged to distend the resilient block to press its engaged blocks outwardly, and a conical split sleeve bearing member between the bolt and the resilient block.

6. In a spring shackle, the combination with the spring sleeve and the bracket sleeve connected by the side links and a bolt passing through each sleeve and the links, of a pair of bearing blocks each grooved to engage one said sleeve respectively, a block of resilient material located between said latter block faces, a plate between each link and the ends of the resilient block and the adjacent blocks, and means to distend the resilient block to press its engaged blocks outwardly.

7. In a spring shackle, the combination with the spring sleeve and the bracket sleeve connected by the side links and a bolt passing through each sleeve and the links, of a pair of bearing blocks each grooved to engage one said sleeve respectively and channeled on the inner opposed faces, a block of resilient material located between said latter block faces, a channeled plate between each link and the ends of the resilient block and the adjacent blocks, and means to distend the resilient block to press its engaged blocks outwardly.

Signed at New York, N. Y., on July 19, 1927.

HENRY E. BLOMGREN.